F., N. & P. SILSBEE.
DROPPING AND MARKING ATTACHMENTS FOR CORN-PLANTERS.
No. 189,581. Patented April 17, 1877.
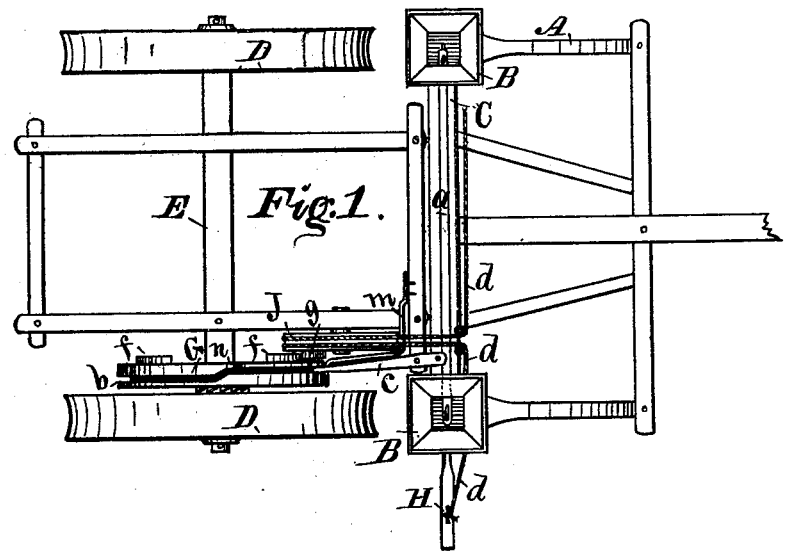
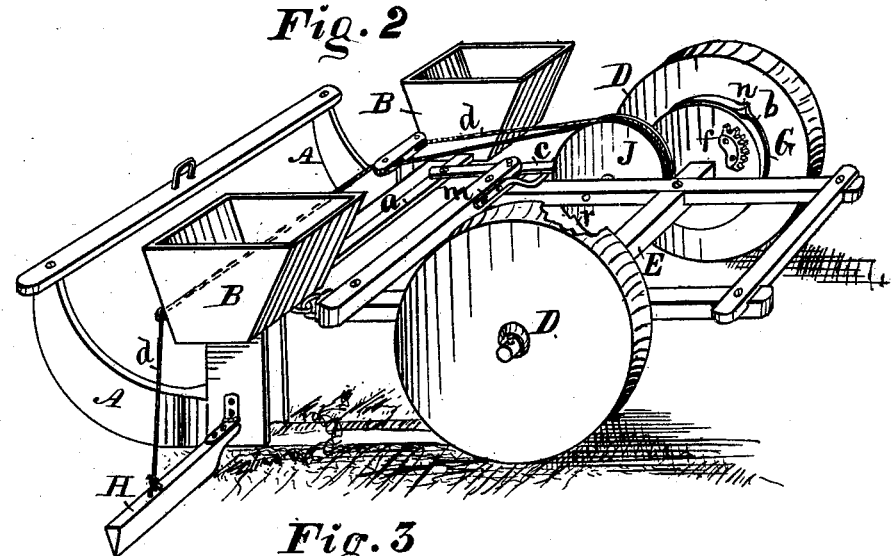
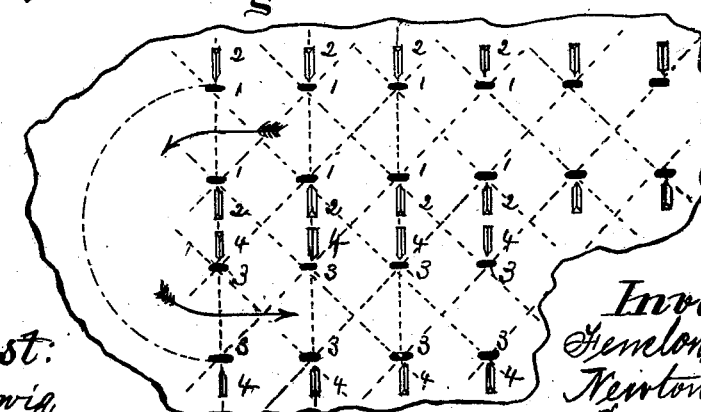
Attest:
R. G. Orwig
C. A. Johnson.
Inventors:
Fenlon Silsbee,
Newton Silsbee,
Peter Silsbee.
By Thomas G. Orwig, atty.

UNITED STATES PATENT OFFICE.

FENELON SILSBEE, NEWTON SILSBEE, AND PETER SILSBEE, OF LITTLE SIOUX, IOWA.

IMPROVEMENT IN DROPPING AND MARKING ATTACHMENTS FOR CORN-PLANTERS.

Specification forming part of Letters Patent No. 189,581, dated April 17, 1877; application filed December 15, 1876.

*To all whom it may concern:*

Be it known that we, FENELON SILSBEE, NEWTON SILSBEE, and PETER SILSBEE, joint inventors, of Little Sioux, in the county of Harrison and State of Iowa, have invented Automatic Machinery for Planting Corn and Marking Check-Rows, of which the following is a specification:

The object of our invention is to economize time and labor in planting corn and other field-crops in check-rows.

It consists in forming, arranging, and combining, with a corn-planter, a grooved cam-wheel, gear-wheels, a pivoted lever, cords, pulleys, and markers, in such a manner that the seed-slide will be automatically operated to drop seed simultaneously in two parallel rows at regular intervals of time and space, and the markers made to print check-rows in the ground at the points where the seeds are deposited, so that previous marking can be dispensed with, all as hereinafter fully set forth.

Figure 1 of our drawing is a top-plan view, illustrating the construction, application, and operation of our invention. Fig. 2 is a perspective view.

A A are the runners of the front carriage. B B are the seed-boxes, mounted upon the bench C of the front carriage. $a$ is the horizontal reciprocating seed-slide, which simultaneously opens and closes the valves of each seed-box. D D are the covering-wheels of the rear carriage, mounted upon the axle E. G is a grooved cam-wheel placed loosely upon the axle E inside of the wheel D. It has a ratchet around its center, on its outside face, to engage a corresponding ratchet or clutch fixed on the inside of the carriage-wheel D. By adjusting the cam-wheel G laterally on the axle E it is readily thrown in and out of gear. An elbow-crank and lever, or any suitable mechanism, may be connected for adjusting it as required at the ends of the field to start right on a return trip. $b$ is the cam-groove in the wheel G. $c$ is a lever pivoted to the frame of the rear carriage at its fulcrum-point, and to the seed-slide $a$ at its front end. Its free end extends rearward to enter the cam-groove $b$ of the rotating wheel G. By this means a uniform reciprocating rectilinear motion is imparted from the driving-wheel D to the seed-slide $a$. Every revolution of the wheels D and G, by means of the two cams standing in reverse positions and at equal distances apart in the groove $b$, causes the pivoted lever $c$ to vibrate, and thereby actuate the seed-slide $a$ to make two motions at regular intervals of time, to drop seeds from each box at regular spaces apart. H H are markers hinged to the benches of the front carriage to stand out at right angles and to swing vertically. J is a vibrating wheel mounted upon a stud-axle extending outward from the frame of the rear carriage. It has a grooved periphery, in which cords or chains are attached, to be wound upon the wheel, and thereby alternately lengthened and shortened to operate the markers H. $d\ d$ are the flexible cords fixed to and wound upon the wheel J. They pass forward to the front of the seed-boxes B, and are there directed laterally and in reverse ways over suitable pulleys to be connected with the markers H. $f\ f$ are pinions or segmental racks fixed on the inside face of the wheel G, to alternately engage a pinion or toothed segment, $g$, that is fixed on the outside face of the wheel J. Every half-revolution of the wheels D and G is by this means made to actuate the wheel J, and thereby wind up and shorten the cords $d$, and lift the hinged markers H. $m$ is a spring fixed to the rear carriage-frame. It extends outward horizontally in front of the wheel J, and then is bent rearward to terminate in a right angle to engage the cams $n$ on the wheel G. In its normal position it presses slightly against the periphery of the wheel J, and slips into a notch, $r$, (shown in Fig. 2,) when the wheel has turned and shortened the cords $d$ and elevated the markers H. It remains in this position until one of the cams $n$ on the edge of the wheel G engages its free end, and presses it forward out of the notch $r$ of the wheel J. This action releases the wheel and cords $d$, and the markers H drop by force of gravity and print marks at right angles to the points where the seeds are dropped. Check-rows are thus marked, as the machine advances, at regular intervals of space, at the same time that the seeds are planted at regular intervals of space in two parallel rows.

Fig. 3 is a plan view, showing the positions of the prints or marks made in the ground by the markers H relative to the points where the seeds are deposited by the uniform reciprocating rectilinear motion of the seed-slide $a$. 1 1 1 1 are the points or spots where the seeds are planted in two parallel rows as the planter passes across a field from right to left. 2 2 2 2 are the marks made by the markers H at the same time the seeds are dropped in the spots 1 1 1 1. 3 3 3 3 are the points where the seeds are planted on a return trip. 4 4 4 4 are the prints made by the markers on the same return trip, and in line with the marks 2, which series of marks 2 2 2 2 are a sufficient guide for directing the operator on his return trip, and to aid him in keeping the planter in proper position to plant a field in check-rows that has not been previously marked.

We claim as our invention—

1. The wheel J, having the pinion $g$, cords $d\ d$, and notch $r$, in combination with the hinged markers H, the spring $m$, and the wheel G, having the pinions $f\ f$ and cams $n\ n$, substantially as and for the purposes shown and described.

2. The grooved cam-wheel G, having the pinions $f$ and cams $n$, the pivoted lever $c$, and seed-slide $a$, the wheel J, having the pinion $g$, notch $r$, and cords $d\ d$, the hinged markers H, and the spring $m$, all arranged and combined substantially as shown and described, to simultaneously plant and mark.

FENELON SILSBEE.
NEWTON SILSBEE.
PETER SILSBEE.

Witnesses:
B. F. CROASDALE,
A. S. CHASE.